United States Patent [19]
Ikegami

[11] 3,776,640
[45] Dec. 4, 1973

[54] METHOD OF AND APPARATUS FOR MEASURING DIMENSIONAL QUANTITIES

[75] Inventor: Yoshizo Ikegami, Amagasaki, Japan

[73] Assignee: Konan Camera Research Institute, Kobe, Japan

[22] Filed: Mar. 1, 1972

[21] Appl. No.: 230,598

[52] U.S. Cl. ......... 356/160, 356/171, 250/219 WD, 350/285, 356/167
[51] Int. Cl. ............................................. G01b 11/04
[58] Field of Search.................... 356/158, 160, 167, 356/171; 250/219 WD; 350/285

[56] References Cited
UNITED STATES PATENTS

| | | | |
|---|---|---|---|
| 3,222,979 | 12/1965 | Webster | 356/160 |
| 3,094,623 | 6/1963 | Weiss | 356/160 |
| 3,384,753 | 5/1968 | Revesz | 356/160 X |
| 3,544,200 | 12/1970 | Boll | 350/285 |
| 2,792,741 | 5/1957 | Mazzon | 350/285 UX |

FOREIGN PATENTS OR APPLICATIONS 176,084   7/1961   Sweden.............................. 356/160

OTHER PUBLICATIONS

"Automated Tape Width Measurement" by Dehmel et al. IBM Tech. Discl. Bltn. Vol. 8, No. 2, July 1965.

Primary Examiner—David Schonberg
Assistant Examiner—Paul K. Godwin
Attorney—Eugene E. Geoffrey, Jr.

[57] ABSTRACT

A method and apparatus for measuring dimensional quantities of articles and particularly articles in motion wherein an image of the article is formed on a patterned plate and then scanning the patterned plate and image formed thereon to produce electric pulses which are related to the dimension of the article and then counting the number of pulses.

3 Claims, 16 Drawing Figures

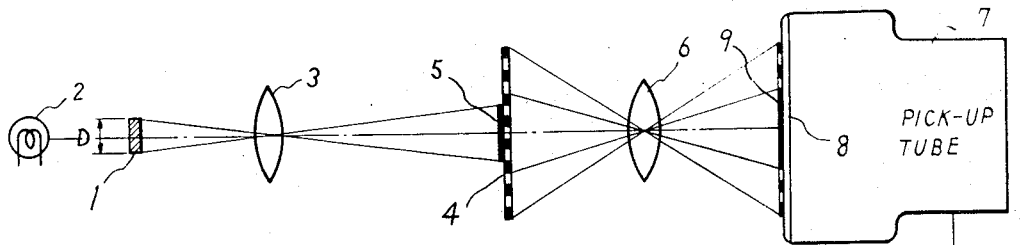
FIG. 1
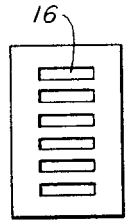 
FIG. 2A  FIG. 2B

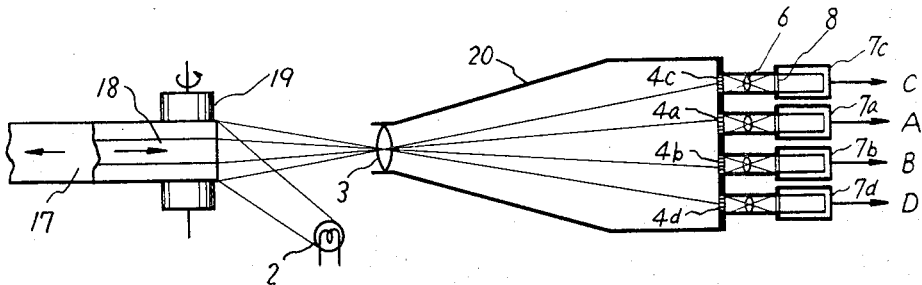
FIG. 4A
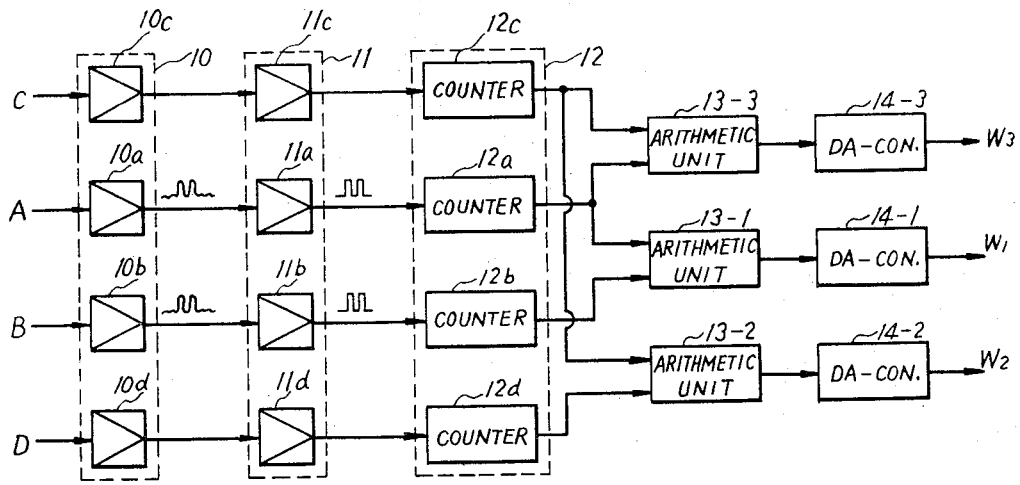
FIG. 4B

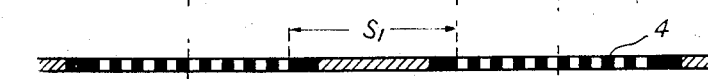
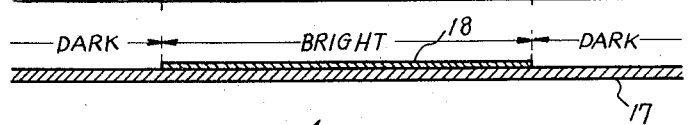
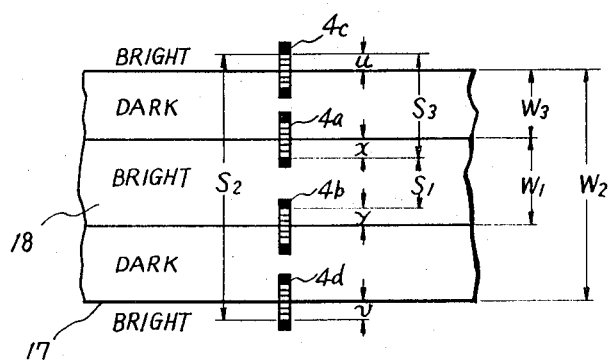
FIG. 6
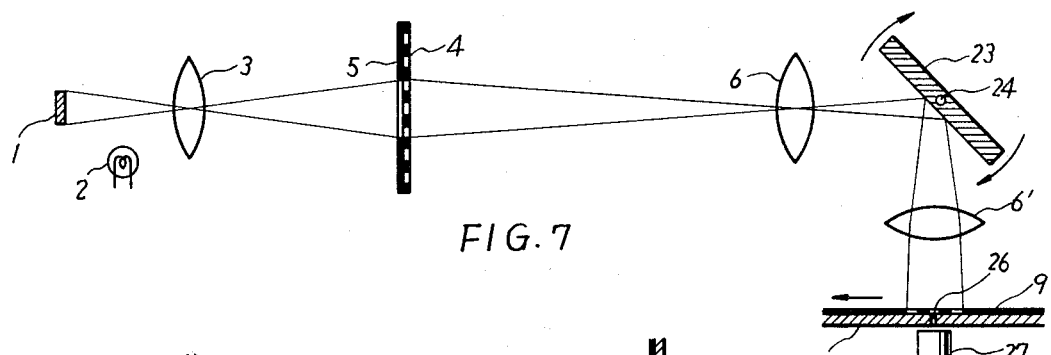
FIG. 7
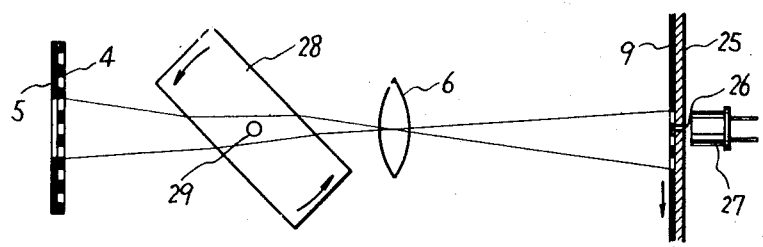
FIG. 8
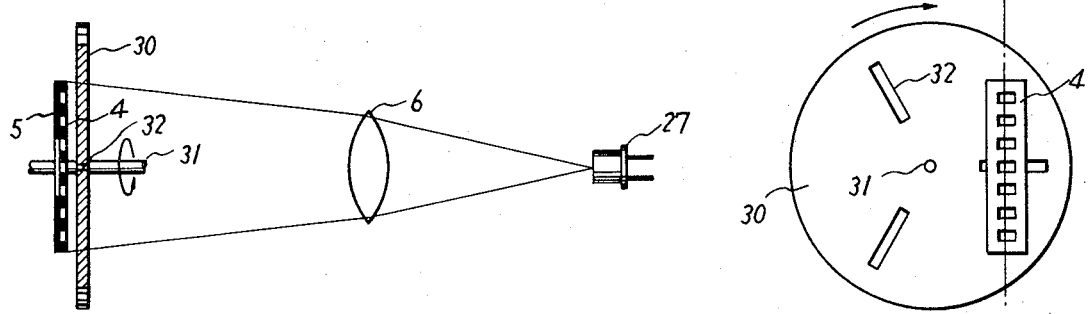
FIG. 9A
FIG. 9B

METHOD OF AND APPARATUS FOR MEASURING DIMENSIONAL QUANTITIES

This invention relates to novel and improved method and apparatus for measuring dimensional quantities which is readily applicable to measurement of sizes of moving articles.

It has been a difficult matter to measure continuously the size of a moving article, such as width of a travelling strip or diameter of a running wire, when the moving speed is high and the article is mechanically untouchable, and especially when the article moves with some mechanical vibration. In such a case, an optical method may be used wherein the size is converted into an electrical quantity such as current or voltage by photoelectric means and the electrical quantity is measured by a suitable apparatus. However, such prior analogic measurements have the basic disadvantages of low accuracy.

One object of this invention resides in the provision of a novel and improved method of measuring dimensional quantities of moving articles accurately and continuously.

Another object of this invention resides in the provision of a novel and improved method of measuring dimensional quantities of articles in digital fashion and indicate them in analog fashion.

A further object of this invention resides in the provision of a novel and improved apparatus for practicing these methods.

According to this invention, a code plate having a striped pattern composed of an alternate arrangement of transparent and opaque strips of equal width previously calibrated with the dimension concerned is provided and the optical image of the dimension which may be magnified, is focused thereon so that the optical image covers a part of the striped pattern. Then, the combined pattern is scanned by suitable scanning means to convert the covered or uncovered stripes into a corresponding number of pulses. The number of pulses are counted by a suitable counting unit and the resultant code is converted into an analog quantity and indicated by an indicator or recorded by a recorder.

Other objects and features of this invention will be more clearly understood from reading the following description with reference to the accompanying drawings.

In the Drawings:

FIG. 1 is a schematic diagram, partly in block form, representing a first embodiment of the measuring apparatus according to this invention;

FIGS. 2(A) and 2(B) are plan views representing two examples of a code plate used in the apparatus of FIG. 1;

FIGS. 3(A) and 3(C) are waveform diagrams representing output signals produced by the pulse generator of FIG. 1;

FIGS. 4(A) and 4(B) are schematic and block diagrams representing a modification of the apparatus of FIG. 1 used for continuous width measurement of a travelling plated strip;

FIGS. 5(A) through 5(C) are diagrams for explaining mutual relationship of the output signal, code plate and plated strip of FIG. 4(A);

FIG. 6 is a diagram explaining the arithmetic operation executed in the circuit of FIG. 4(B);

FIG. 7 is a schematic diagram representing a second embodiment of the measuring apparatus according to this invention;

FIG. 8 is a schematic diagram representing a third embodiment of the measuring apparatus according to this invention; and FIGS. 9(A) and 9(B) are schematic side and front diagrams representing a fourth embodiment of the measuring apparatus according to this invention, wherein FIG. 9(A) represents a sectional view along the line IX—IX of FIG. 9(B).

Throughout the drawings, like reference numerals are used to denote like structural components.

Figure 3A:

Referring first to FIG. 1 representing a first embodiment of the measuring apparatus of this invention, an article 1 having a dimension D to be measured is illuminated by a lamp 2 from the back and its shaded image 5 is focused by a lens system 3 onto a code plate 4. The code plate 4 is a thin metal plate having a plurality of parallel slits 16 arranged at equal intervals, for example, as shown in FIG. 2(A). Alternatively, the code plate 4 may be a transparent glass plate having a plurality of parallel opaque strips applied to one surface thereof at equal intervals as shown in FIG. 2(B). The pitch of the striped pattern, that is, the total widths of the transparent and opaque strips may be arbitrarily determined but it is conveniently selected to be equal to a unit graduation of a standard scale which is suitably applicable to measurement of the corresponding dimension of the image 5. Magnification or reduction of the image 5 may be appropriately selected in accordance with the magnitude of the dimension D and desired accuracy of measurement.

The combination of the image 5 and the code plate 4 is again focused by a second lens system 6 onto a photoelectric screen 8 of a pick-up tube 7 such as an image orthicon, as a composite image 9. The composite image 9 corresponds to the code plate 4 but a part which corresponds to the shaded image 5 is shaded or darkened. In this condition, if an electron scanning beam of the pick-up tube 7 scans the composite image 9 from the top to the bottom of the drawing, an image signal is produced from the output terminal of the pick-up tube 7 and shaped by a pulse generator 11. FIG. 3 shows three kinds of waveforms of the output pulses from the pulse generator 11 wherein (A) is the output when the article 1 does not exist in the system and (B) is the output in the case of FIG. 1. If the lamp 2 is located between the article 1 and the lens system 3 to illuminate the reflective front face of the article 1, it is apparent that the output of the pulse generator 11 should be as shown by (C) of FIG. 3.

Figure 3B:
Figure 3C:

The output pulses of the pulse generator 11 are applied to a pulse counter 12 to count the number of pulses. Then, the output code indicating the number of pulses is applied to an arthmetic unit 13 and here an arthmetic operation such that the number of pulses of FIG. 3(B) is reduced from the number of pulses of FIG. 3(A) which is previously stored in the memory in the unit 13 to obtain the number of pulses corresponding to the dimension of article 1. If necessary, the digital code indicating the true dimension of the article 1 is calculated in the arithmetic unit 13. The digital output of the arithmetic unit 13 is fed to a digital-analog convertor 14 to be converted into an analog signal and indicated by an indicator unit 15 such as a meter or recorder. When the system is arranged so that the output of the pulse generator 11 is shown by FIG. 3(C), the arithmetic unit 13 may be omitted. If a digital indication is required, a suitable digital indicator unit may be connected in place of the digital-analog convertor 14 and the analog indicator unit 15.

When the article 1 is a long strip travelling at high speed and the dimension D is its width, the scan line of the electron beam tends to deviate from a perpendicular to the longitudinal axis of the strip. This tendency becomes more pronounced with an increase of the speed of the strip and a decrease of the scanning frequency. However, when, for example, a strip having a width of 10 millimeters and travelling at a speed of 300 millimeters per second is scanned by an electron beam at a scanning frequency of 5,000 cycles per second, the time for one scan is 200 microseconds and the travelling length of the strip for this time is 0.06 millimeters. Accordingly, the practical scanning length is calculated as 10.00018 millimeters and the error, 0.00018 millimeters is negligible in practice. However, this error becomes larger with an increase of the width of the strip. Therefore, at the time of large width measurement, the use of a plurality of scanning beams as hereinunder described is recommended. Such multiplex scanning also overcomes the need for a very large photoelectric screen on the pick-up tube, which is also needed with strips of large widths.

FIGS. 4(A) and 4(B) show in combination a modification of the system of FIG. 1, which can execute continuous and concurrent measurement of the strip width, plating width and plating position of a long, partially plated strip. In the drawings, a long strip 177 having a longitudinal plated portion 18 on a central part of the width is fed from the left-hand side, turns around a roller 19 and returns to the left-hand side. The strip is illuminated by an electric lamp 2 from the right-hand side and the reflected light passes through a lens system 3 into a dark chamber 20 to form a magnified image on the bottom of the chamber. The bottom wall of the dark chamber is provided with four code plates 4a, 4b, 4c and 4d which are similar to that described in conjunction with the system of FIG. 1 and arranged so that both the edges of the plated portion 18 are imaged on the plates 4a and 4b and both the edges of the strip 17 are imaged on the code plates 4c and 4d, respectively. For instance, if ×10 magnification is applied to the image and 0.1 millimeter pitch is adopted for the code plates, the accuracy of this system will be 10 microns.

The images projected on the code plates 4a, 4b, 4c and 4d are respectively focused through lens system 6 onto the photoelectric screens 8 of four separate pick-up tubes 7a, 7b, 7c and 7d and scanned by individual electron beams, thereby producing respective video signal outputs A, B, C and D. The outputs A, B, C and D are respectively amplified by amplifiers 10a, 10b, 10c and 10d included in an amplifying unit 10 and then shaped by a pulse generator unit 11 including four pulse generators 11a, 11b, 11c and 11d into a train of square wave pulses. The output pulses from the pulse generators 11a, 11b, 11c and 11d are respectively counted by four digital counters 12a, 12b, 12c and 12d included in a counter unit 12. The output counts from the counter unit 12 are processed as hereinunder described in three arithmetic units 13-1, 13-2 and 13-3 and the digital outputs of these units are converted by respective digital-analog convertors 14-1, 14-2 and 14-3 into three analog signals W1, W2 and W3 which are to be applied to indicators or recorders.

FIG. 5 represents the relationship of the video signal (A), code plates (B) and plated strip (C). In this example the reflectivity of the plated portion 18 is higher than that of the surface of the strip 17. While the reflected light produces pulse-like voltage increases in correspondence with the respective transparent strips of the code plates 4, these voltage increases are composed of high peaks 21 corresponding to the plated portion 18 and low ripples 22 as shown in FIG. 5(A). In the pulse generator unit 11, the high peaks 21 are shaped into square wave pulses but the low ripples 22 are eliminated, therefore, only the number of the high peaks 21 is counted in each counter.

Now, the principle of the arithmetic operations in the arithmetic units 13-1, 13-2 and 13-3 will be described with reference to FIG. 6. In the drawing, the surface of the roller 19 (FIG. 4A) is further assumed to have a higher reflectivity than the surface of the strip 17 and, therefore, four counts corresponding to the dimensions $x$, $y$, $u$ and $v$ are respectively obtained from the outputs of the counters 12a, 12b, 12c and 12d. The four code plates 4a, 4b, 4c and 4d are fixed with respect to each other and three reference dimensions S1, S2 and S3 are previously measured at high accuracy and stored in the permanent memories in the arithmetic units 13-1, 13-2 and 13-3, respectively.

Assuming the widths of the plated portion 18 and the strip 17 as W1 and W2 respectively, and the width of one edge thereof as W3, as shown in FIG. 6, then $$W1 = S1 + x + y$$
$$W2 = S2 - (u + v)$$
$$W3 = S3 - (x + u)$$

These operations are executed respectively in the arithmetic units 13-1, 13-2 and 13-3 in a fashion well known in the art. Therefore, the digital outputs of the arithmetic units and the analog outputs of the digital-analog convertors 14-1, 14-2 and 14-3 correspond accurately to the dimensions W1, W2 and W3 respectively.

When the strip 17 shifts upwardly by a dimension $z$, the counts of the counters 12a and 12b correspond to dimensions $(x + z)$ and $(y - z)$ and the width $W1 = S1 + (x + z) + (y - z) = S1 + x + y$. Thus, the deviation $z$ is automatically cancelled during the arithmetic operation in the arithmetic units 13-1. This is also true of the other dimensions W2 and W3. In other words, there is no influence of mechanical vibration of the strip in accordance with the method of this invention. This is one of the greatest features of the present invention.

While electronic scanning is adopted in the above embodiments, photomechanical scanning can be adopted when the scanning frequency need not be so high. Now, the photomechanical scanning will be described with reference to FIGS. 7 through 9. In FIG. 7, arrangement of the components 1, 2, 3, 4 and 5 are similar to that of FIG. 1, except that the article is illuminated by a lamp 2 from the forward direction and, accordingly, a bright image 5 of the article is formed on the code plate 4 which is the reverse of the case in FIG. 1. The composite image of the article and code plate is again projected through a lens system 6 and 6' and a rotary mirror 23 onto a shield board 25 having a slit or pin hole 26. The projected image 9 has a striped pattern corresponding to the article 1 in the central portion. At the rear of the shield board 25, there is located a photoelectric element such as photodiode 27 facing the slit or pin hole 26. If the mirror 23 is rotated about the axis 24 in a clockwise direction, for example, the composite image 9 moves to the left and this results in a scan of the composite image 9 by the photoelectric element 27. Thus, the photoelectric element 27 produces an output as shown in FIG. 3(C). As this output corresponds directly to the dimension of the article 1, the output of the pulse counter 12 (FIG. 1) represents that dimension.

FIG. 8 shows a similar scanning arrangement. In this arrangement a parallel prism 28 rotatable about the axis 29 is positioned in place of the rotary mirror 23 in FIG. 7. It will be self-evident that the composite image 9 on the shield board 25 moves downwardly when the prism 28 is rotated in a counterclockwise direction as shown in the drawing.

The arrangement of FIGS. 9(A) and 9(B) includes a rotating disc 30 located just after the code plate 4. The disc 30 has at least one radial slit 32 which can fully cover the code plate 4 when rotated. The code plate 4 is focused by a lens system 6 onto the sensitive surface of the photoelectric element 27. It is self-evident that the composite image is scanned successively and the element 27 produces output pulses when the disc 30 is rotated about a central shaft 31. When a plurality of radial slits 32 are provided in the disc 30 for the purpose of increasing the scanning frequency, it should be noted that they are arranged so that one slit begins to scan the code plate after the preceding slit completely finishes the preceding scan.

As described in the above, according to this invention, high accuracy can be obtained by increasing the magnification factor of the lens system. However, when high accuracy is not required, the lens system 3 can be omitted by locating the code plate 4 close to the article 1. When the article is so large that it cannot be scanned completely, a reduction lens system may be used to form a small image. Further, by using a telescope as the lens system 3, a remotely located article can be measured easily.

While this invention exhibits its advantages best when applied to continuous measurement or quality control of a long moving article, it is also applicable to measurement of a dimension of a stationary article. The invention is also useful for continuous monitoring of a fluctuating dimension of a stationary article, such as water level.

What is claimed is:

1. Apparatus for measuring the dimensional quantities of an article comprising a code plate having a striped pattern consisting of an alternate arrangement of transparent and opaque stripes, means forming an optical image of said article on said code plate to illuminate a portion of said code plate proportional to the size of said article, an opaque screen having a slit therein, means forming an otpical image of said illuminated portion of said code plate on one side of said screen, a photoelectric element disposed on the other side of said screen for receiving light passing through said slit, optical means disposed between said code plate and said screen for moving the image of said code plate relative to said screen to produce pulses of light traversing said slit for detection by said photoelectric element and means connected with said photoelectric element for counting the number of pulses.

2. Apparatus according to claim 1 wherein the last said optical means is a rotary mirror.

3. Apparatus according to claim 1 wherein the last said optical means is a rotary parallel prism.

* * * * *